(12) United States Patent
Soderquist et al.

(10) Patent No.: US 8,506,911 B2
(45) Date of Patent: Aug. 13, 2013

(54) COMPOSITIONS AND METHODS FOR TREATING NUCLEAR FUEL

(75) Inventors: Chuck Z. Soderquist, Richland, WA (US); Amanda M. Johnsen, Richland, WA (US); Bruce K. McNamara, Richland, WA (US); Brady D. Hanson, Richland, WA (US); Steven C. Smith, Richland, WA (US); Shane M. Peper, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 923 days.

(21) Appl. No.: 12/511,341

(22) Filed: Jul. 29, 2009

(65) Prior Publication Data

US 2011/0024704 A1 Feb. 3, 2011

(51) Int. Cl.
*C22B 34/34* (2006.01)
*C01G 39/00* (2006.01)
*C01G 39/02* (2006.01)
*G21C 19/42* (2006.01)
*G21G 4/00* (2006.01)

(52) U.S. Cl.
USPC .............. 423/54; 423/53; 423/55; 423/56; 423/6; 423/11; 423/16; 423/17; 252/637; 252/638; 976/DIG. 279

(58) Field of Classification Search
USPC .............. 423/53, 54, 55, 56, 6, 11, 16, 17; 252/637, 638; 976/DIG. 279
See application file for complete search history.

(56) References Cited

U.S. PATENT DOCUMENTS

| | | | | |
|---|---|---|---|---|
| 3,083,076 A | * | 3/1963 | Drobnick et al. | 423/9 |
| 3,322,679 A | | 5/1967 | Kamemoto et al. | |
| 4,094,953 A | * | 6/1978 | Hadi et al. | 423/2 |
| 4,155,982 A | * | 5/1979 | Hunkin et al. | 423/7 |
| 4,273,745 A | * | 6/1981 | Laferty et al. | 423/54 |
| 4,304,757 A | * | 12/1981 | Kuehl et al. | 423/15 |
| 4,366,126 A | * | 12/1982 | Gardner | 423/7 |
| 4,375,452 A | * | 3/1983 | Jan et al. | 423/7 |
| 4,405,566 A | * | 9/1983 | Weir et al. | 423/15 |
| 4,430,308 A | * | 2/1984 | Fletcher | 423/7 |
| 4,464,345 A | * | 8/1984 | Yan | 423/7 |
| 4,606,894 A | * | 8/1986 | Kunin et al. | 423/7 |
| 4,891,193 A | * | 1/1990 | Beutier et al. | 423/54 |
| 5,205,999 A | | 4/1993 | Willis et al. | |
| 5,419,881 A | * | 5/1995 | Sameh et al. | 423/20 |
| 5,508,010 A | * | 4/1996 | Sameh et al. | 423/2 |
| 6,337,055 B1 | * | 1/2002 | Betenekov et al. | 423/2 |
| 2003/0234223 A1 | * | 12/2003 | Kuraoka et al. | 210/660 |
| 2009/0269261 A1 | * | 10/2009 | Kim et al. | 423/16 |

FOREIGN PATENT DOCUMENTS

WO WO 01/39209 A2 5/2001

OTHER PUBLICATIONS

PCT/US2010/039625 IPRP, Jan. 31, 2012, Battelle Memorial Institute.
PCT/US2010/039625 SearchReport, Jan. 12, 2011, Battelle Memorial Institute.

(Continued)

*Primary Examiner* — Joseph D Anthony
(74) *Attorney, Agent, or Firm* — Wells St. John P.S.

(57) ABSTRACT

Compositions are provided that include nuclear fuel. Methods for treating nuclear fuel are provided which can include exposing the fuel to a carbonate-peroxide solution. Methods can also include exposing the fuel to an ammonium solution. Methods for acquiring molybdenum from a uranium comprising material are provided.

18 Claims, 7 Drawing Sheets

(56) References Cited

OTHER PUBLICATIONS

PCT/US2010/039625WrittenOpinio, Jan. 12, 2011, Battelle Memorial Institute.
Adachi et al.; Journal of Nuclear Materials, "Dissolution Study of Spent PWR Fuel: Dissolution Behavior and Chemical Properties of Insoluble Residues" 1990; pp. 60-71.
Asanuma et al.; Journal of Nuclear Science and Technology, vol. 38 No. 10, "New Approach to the Nuclear Fuel Reprocessing in Non-Acidic Aqueous Solutions" 2001; pp. 866.
Baran et al.; Inorganica Chimica Acta vol. 81, "Formation of the Ammonium-Uranyl-Carbonate Complexes of the Type (NH4)4[UO2(CO3)3], Prepared by Precipitative Re-extraction" 1981; pp. 83.
Bradbury, et al.; Journal of Nuclear Materials, "Electron Probe Micro-Analysis of Irradiated UO2" 1965; pp. 227.
Bramman et al.; Journal of Nuclear Materials, "Metallic Fission-Product Inclusions in Irradiated Oxide Fuels" 1968; pp. 201.
Chou et al; Journal of Nuclear Materials, "Precipitation Studies of Ammonium Uranyl Carbonate from UO2F2 Solutions" 1989; pp. 171.
Clarens et al.; Environmental Science and Technology, "Formation of Studtite During the Oxidative Dissolution of UO2 by Hydrogen Peroxide: A SFM Study" 2004; pp. 6656-6661.
Clark et al.; Chemical Reviews, "Actinide Carbonate Complexes and their Importance in Actinide Environmental Chemistry" 1995; pp. 25.
Davies et al.; Journal of Nuclear Materials, "The Chemical Effects of Composition Changes in Irradiated Oxide Fuel Materials" 1971; pp. 143.
Davis et al.; Journal of Colloid and Interface Science, "Surface Ionization and Complexation at the Oxide/Water Interface: Surface Properties of Amorphous Iron Oxyhydroxide and Adsorption of Metal Ions" 1978; pp. 90-107.
de Pablo et al.; Geochemica et Cosmochimica Acta vol. 63, No. 19/20, "The Oxidative Dissolution Mechanism of Uranium Dioxide: The Effect of Temperature in Hydrogen Carbonate Medium" 1999; pp. 3097-3103.
Del Cul et al.; Separation Science and Technology, "Evaluation of Process that Might Lead to Separation of Actinides in Waste Storage Tanks Under Alkaline Conditions" 2000; pp. 2127.
Goldik et al.; Electrochimica Acta vol. 51, "Surface Electrochemistry of UO2 in Dilute Alkaline Hydrogen Peroxide Solution, part II, Effects of Carbonate Ions" 2006; pp. 3278.
Grenthe et al.; Elsevier Science Publishing Company, Inc., "Chemical Thermodynamics of Uranium" 1992.
Griepink et al.; Microchimica Acta vol. 52 No. 5, "The Alizarin-S Spot Test for Aluminium in the Presence of Zirconium, in Systematic Qualitative Analysis" 1964.
Guenther et al.; Pacific Northwest National Laboratory Report PNL-5109-105, "Characterization of Spent Fuel Approved Testing Method—ATM-105" 1991.
Guenther et al.; Pacific Northwest National Laboratory Report PNL-5109-106, "Characterization of Spent Fuel Approved Testing Method—ATM-106" 1987.
Jeffery, B. M.; Journal of Nuclear Materials, "Microanalysis of Inclusions in Irradiated UO2" 1967; pp. 33.
Kim et al.; Industrial and Engineering Chemistry and Research col. 48, "Study on Electrolytic Recoveries of Carbonate Salt and Uranium From a Uranyl Peroxo Carbonato Complex Solution Generated From a Carbonate-Leaching Process" 2009; pp. 2085.
Kleykamp et al.; Journal of Nuclear Materials, "X-Ray Diffraction Studies on Irradiated Nuclear Fuels" 1984; pp. 56-63.
Kleykamp, H.; Journal of Nuclear Materials, "The Chemical State of the Fission Products in Oxide Fuels" 1985; pp. 221.
Lee et al.; Journal of Nuclear Materials vol. 185, "A Quasi-Optimization of the Ammonium Uranyl Carbonate Process" 1991; pp. 190.
Marajofsky et al.; Journal of Nuclear Materials, "On the Dependence of Characteristics of Powders on the AUC Process Parameters" 1991; pp. 154.

Marquart et al.; Journal of the Less-Common Metals, "Preparation and Properties of Complex Carbonates of Hexavalent Actinides" 1983; pp. 119.
Mason et al.; Environmental Science and Technology vol. 31, "carbonate Leaching of Uranium, from Contaminated Soils" 1997; pp. 2707.
Meca et al.; Radiochimica Acta, "Uo2 Dissolution in the Presence of Hydrogen Peroxide at pH > 11" 2008; pp. 535-539.
National Lead Company, Inc, AEC Research and Development Report: "Summary Report" 23rd edition (WIN-115), 1954-1959; pp. 1-94.
O'Boyle et al.; Journal of Nuclear Materials, "Analysis of Fission Product Ingots Formed in Uranium-Plutonium Oxide Irradiated in EBR-II" 1970; pp. 257.
O'Boyle et al.; Journal of Nuclear Materials, "Solid Fission Product Behavior in Uranium-Plutonium Oxide Fuel Irradiated in a Fast Neutron Flux" 1969.
Palmer et al.; Chemical Reviews, "The Chemistry of Metal Carbonato and Carbon Dioxide Complexes" 1983; pp. 651.
Pan et al.; Journal of Nuclear Materials, "The Conversion of UO2 via Ammonium Uranium Carbonate: Study of Precipitation, Chemical Variation and Powder Properties" 1981; pp. 135.
Peper et al.; Industrial and Engineering chemistry Research, "Kinetic Study of the Oxidative Dissolution of UO2 in Aqueous Carbonate Media" 2004; pp. 8188-8193.
Pierce et al.; Journal of Nuclear Materials, "Experimental Determination of Uo2(cr) Dissolution Kinetics: Effects of Solution Saturation State and pH" 2005; pp. 206-218.
Shoesmith, D. W.; Journal of Nuclear Materials, "Fuel Corrosion Processes Under Waste Disposal Conditions" 2000.
Soderquist et al.; Journal of nuclear Materials, "Dissolution of Spent Nuclear Fuel in Carbonate-Peroxide Solution" 2010; pp. 159-162.
Sunder et al.; Corrosion Science, "Corrosion of Uranium Dioxide in Hydrogen Peroxide Solutions" 2004; pp. 1095-1111.
Clark et al., "The Extraction of Uranium from Pitchblende by Ammonium Carbonate", Yale Univeristy, Sterling Chemistry Laboratory, New Haven, Connecticut (1947) 12 pages.
Delegard et al., "Transportability Class of Americium in K Basin Sludge under Ambient and Hydrothermal Processing Conditions", PNNL-16018 (2006) 25 pages.
Goncalves et al., "Dissolution and Ion Exchange Operations Mathematical Modeling in a 99Mo Production Process for Medical Purposes", 1998 International Meeting on Reduced Enrichment for Research and Test Reactors, Sao Paulo, Brazil.
Gureli et al., "Recovery of Uranium from Ammonium Uranyl Carbonate (AUC) Effluents by Combined Ion Exchange and Membrane Separation", Separation Science and Technology vol. 39, No. 8 (2004) pp. 1857-1869.
Hollis, E. T. "Laboratory Studies in Carbonate Ion Exchange for Uranium Recovery", National Lead Company, Inc., Winchester, Massachusetts (1958) 56 pages.
Hurst et al., "Recovery of Uranium from Di(2-Ethylhexyl) Phosphoric Acid (Dapex) Extractant with Ammonium Carbonate", Oak Ridge National Laboratory (1960) 24 pages.
Kattner, W. T., "Lab Survey of Deoxidants for Uranium Chips", General Electric Company, Richland, Washington (1950) 4 pages.
Kaufman et al., "A Summary Report on the Ion Exchange Process for the Recovery of Uranium", Raw Materials Development Laboratory Atomic Energy Division Americal Cyanamid Company, Winchester, Massachusetts (1954) 61 pages.
Kurnakov, N. S., "Complex Compunds of Uranium" Academy of Sciences of the USSR Institute of General and Inorganic Chemistry (1966) pp. 17-31.
Ladeira et al., "Uranium Recovery from Industrial Effluent by Ion Exchange—Column Experiments", Minerals Engineering 18 (2005) pp. 1337-1340.
Van der Walt et al., "The Isolation of 99Mo from Fission Material for Use in the 99Mo/99mTc Generator for Medical Use", Radiochim Acta 92, 2004, pp. 251-257.

* cited by examiner

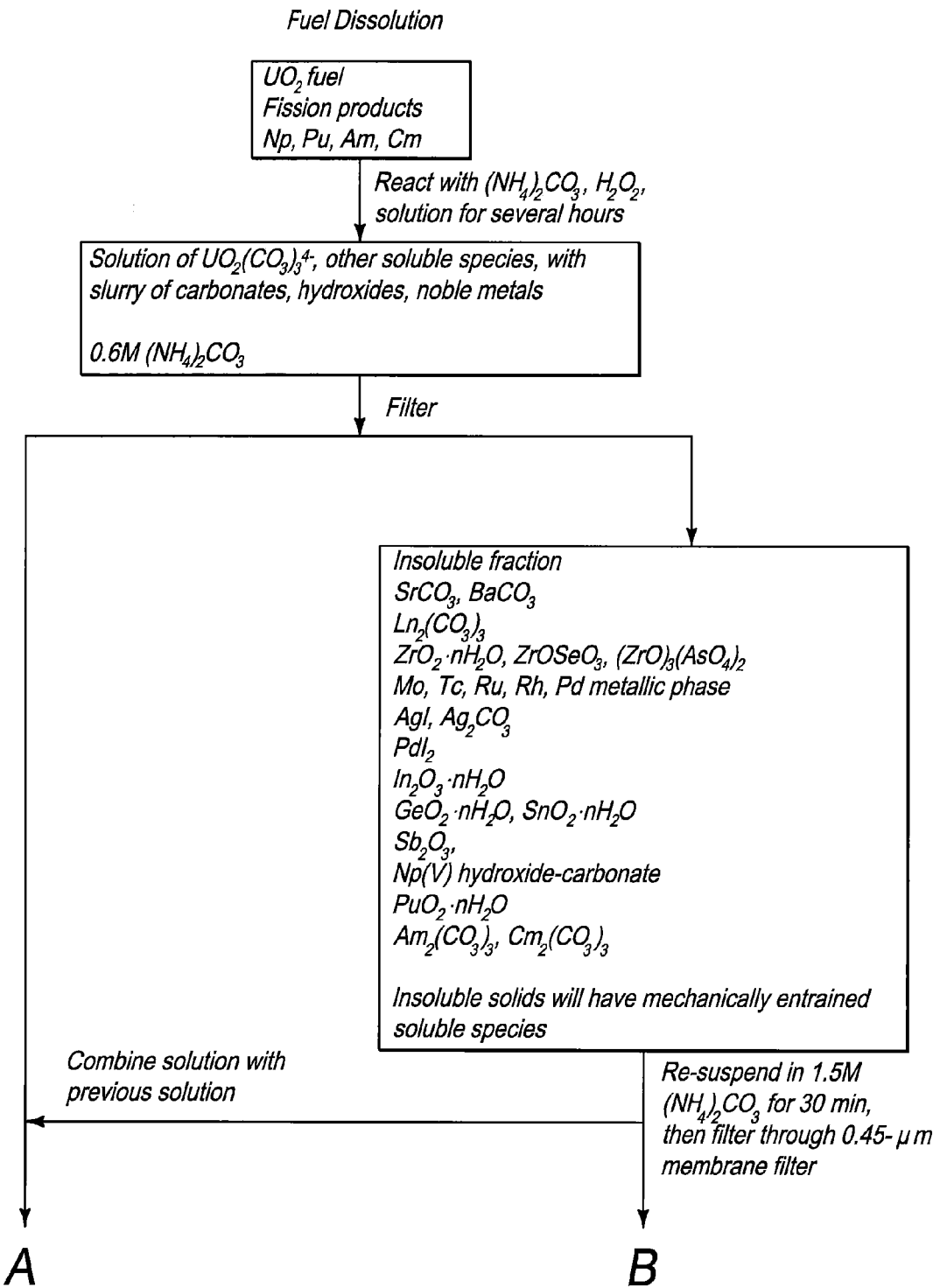

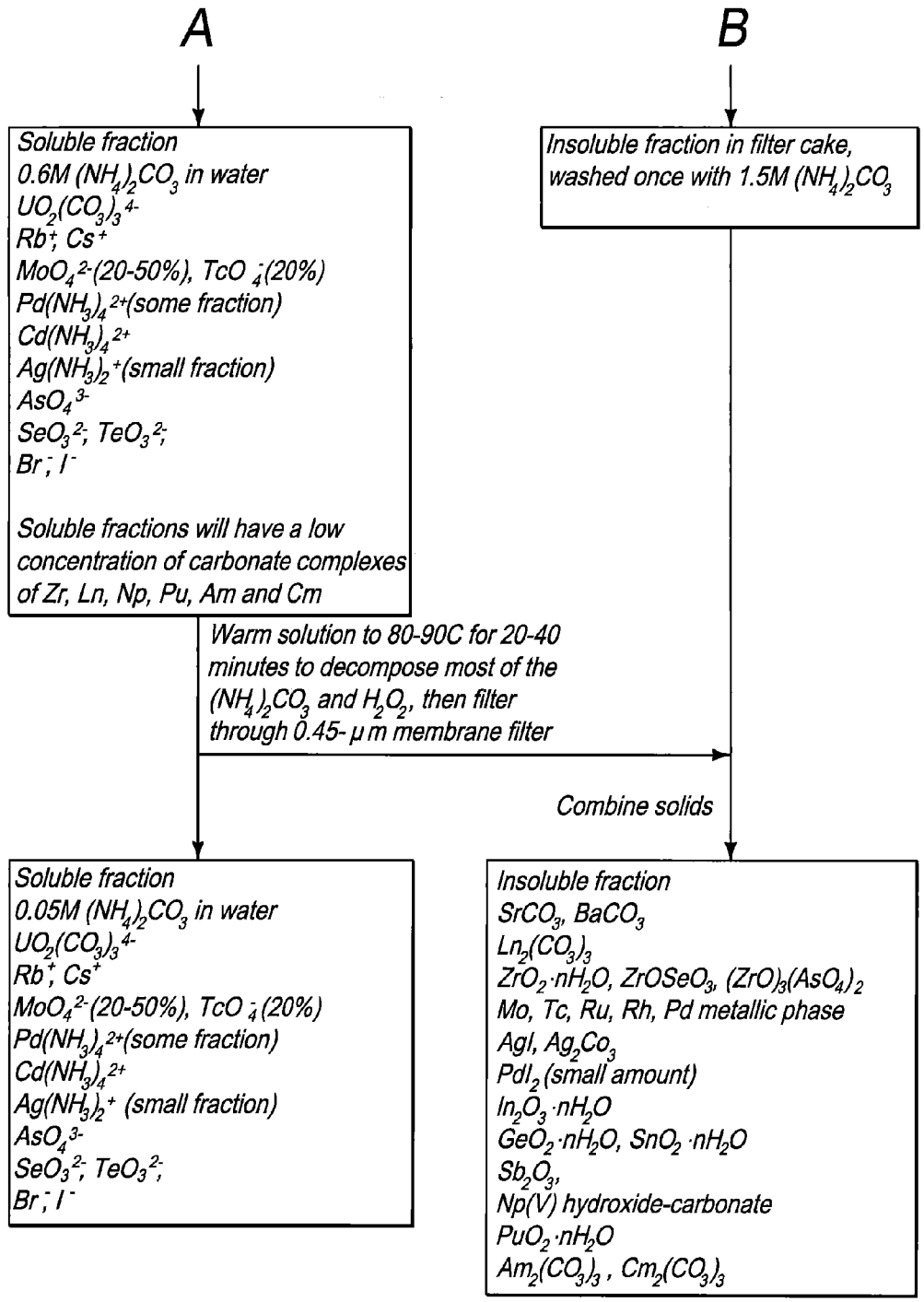

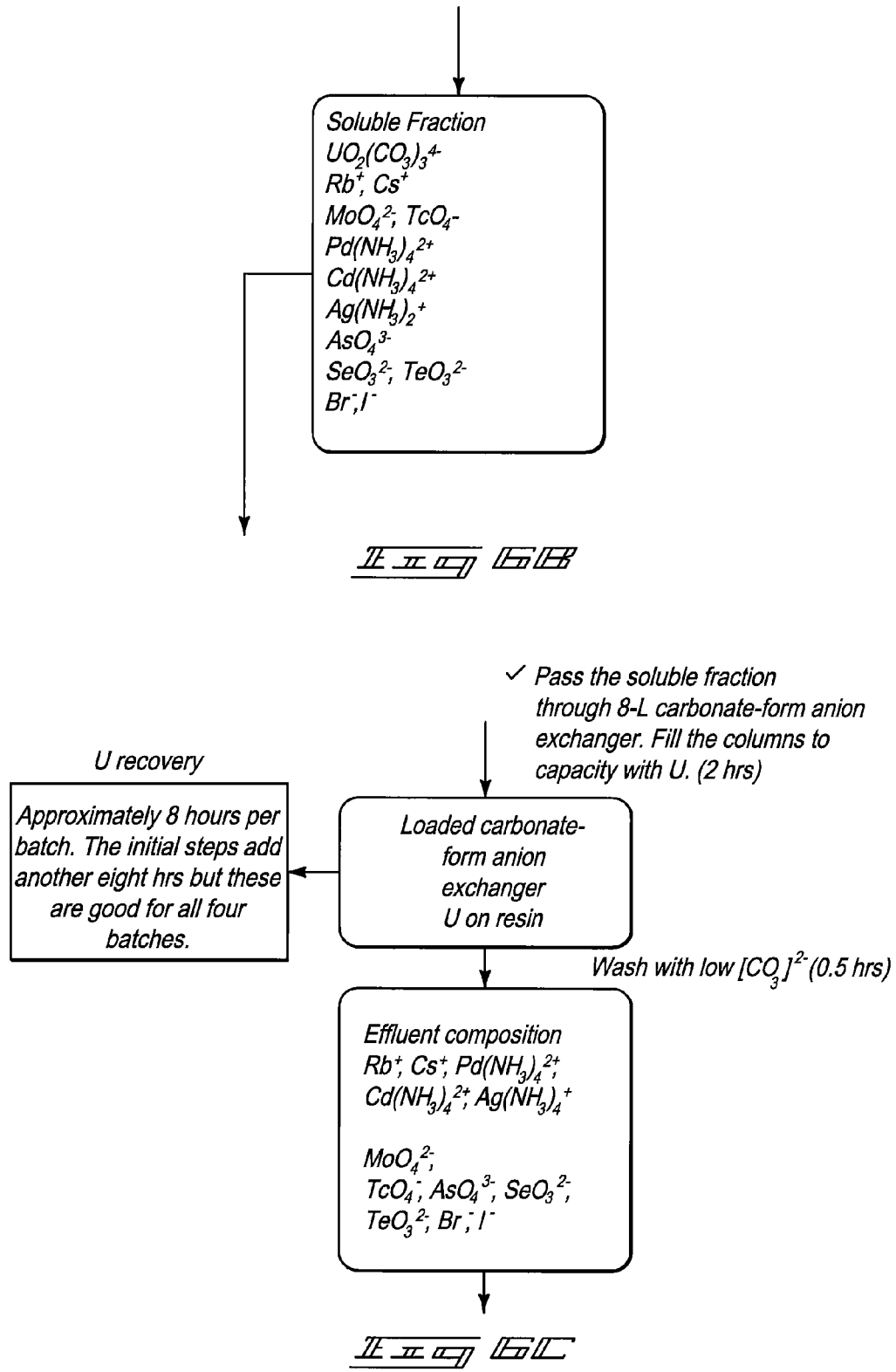

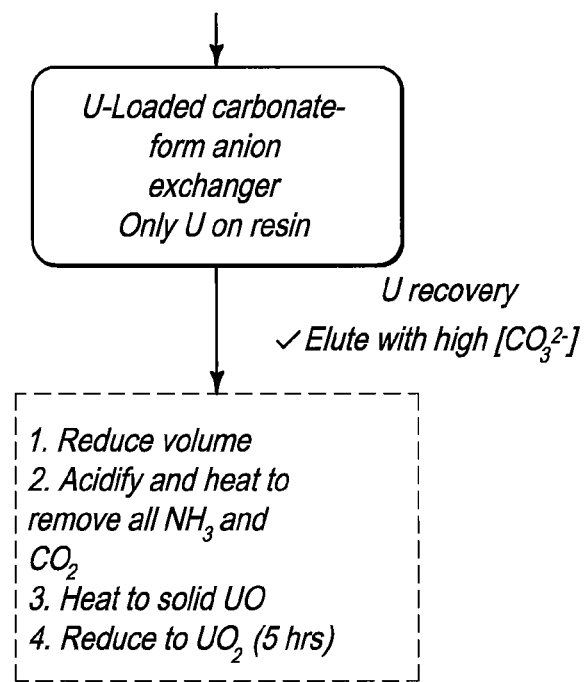

COMPOSITIONS AND METHODS FOR TREATING NUCLEAR FUEL

STATEMENT OF GOVERNMENT SUPPORT

This invention was made with Government support under Contract DE-AC05-76RLO1830 awarded by the U.S. Department of Energy. The Government has certain rights in the invention.

TECHNICAL FIELD

The present disclosure relates generally to compositions and the treatment of uranium-comprising materials. Particular embodiments of the disclosure relate to compositions and methods as well as systems for treating nuclear fuel.

BACKGROUND

As part of the process for utilizing nuclear fuel to generate power, the fuel is irradiated. The fuel can be, for example, $UO_2$-based fuel, Mixed Oxide (MOX) fuels, and/or U-metal fuels. Irradiated nuclear fuel can be the product of the irradiation of many kinds of commercial fuels as well as defense fuels, and these fuels can be classified as spent fuel and/or irradiated uranium.

Processing this fuel, either before or after irradiation, can be problematic. Irradiated fuel can be particularly problematic in view of the various transmutated and fission products that are generated. Problems associated with the processing can include environmental and/or health hazards as well as problems associated with nuclear material safeguards and security, cost, storage, and/or disposal.

From an environmental and/or health standpoint for example, the fuel can contain components that have been classified as environmentally hazardous and/or toxic that must meet regulatory processing and disposition requirements. For example, certain actinide and fission products can dictate handling fuel according to comparably expensive methods rather than comparably inexpensive methods were such components below regulated levels. This handling can include highly regulated storage and/or disposal techniques. Also, previous processing techniques can introduce and/or generate environmentally hazardous components such as organic solvents and/or $NO_X$, for example.

Further, the fuel contains valuable components whereby the recycling or extraction of such components is highly desirable. Uranium and/or plutonium within the fuel, for example, are valuable components that if recycled can provide for more cost efficient fuel and energy production as well as less waste for storage and/or disposal. In addition, the extraction of industrial- and medically-useful radioisotopes such as molybdenum-99 can be desirable.

In the past, these fuels have been treated according to what is referred to as the Plutonium and Uranium Extraction (PUREX) process. Generally, the fuel has been exposed to a hot nitric acid bath to isolate the uranium by oxidizing the $UO_2$ to $UO_2^{2+}$, for example. This process can dissolve the fuel matrix as well as all the fission products. While a great deal of energy is necessary to dissolve the fuel in hot nitric acid, aside from this additional energy expense, as the $UO_2$ fuel is dissolved in the nitric acid, a large volume of NO and $NO_2$ gases are formed and sent up processing stacks. Some noble gas fission products such as xenon and krypton can be completely released and proceed up the stacks as well. It has been found that fission products such as iodine and bromine also appear in the stack gases. Ruthenium also evaporates and can condense in the stacks. Tritium can be expelled up the stacks as well. Undissolved components of the hot nitric acid treatment can remain, and these components can include Mo, Tc, Ru, Rh, and Pd.

Following the nitric acid extraction, organic extractants such as tributyl phosphate (TBP) are dissolved in organic solvents and used to facilitate the separation of the actinides from each other and from other fission products. Problematically, these processing techniques accumulate combustible organic solvents and corrosive acids which can result in radiation induced solvent degradation. Further, valuable actinides may be lost among fission product waste and highly radiotoxic mixed wastes may be generated.

SUMMARY

Compositions are provided that include irradiated nuclear fuel and ammonium. According to example implementations, the compositions can include the irradiated nuclear fuel and alkaline carbonates such as ammonium carbonate. Compositions are also provided that include irradiated nuclear fuel; carbonate; and peroxide.

Methods for treating irradiated nuclear fuel are provided. The methods can include exposing the fuel to a carbonate-peroxide solution to dissolve at least a portion of the uranium into the solution. Methods can also include exposing the fuel to an ammonium solution to dissolve at least a portion of the uranium into the solution, and removing at least some of the ammonium from the solution to acquire the uranium. Methods can include preparing a mixture comprising the fuel and an aqueous solution; and maintaining the mixture below a temperature of about 100° C. while dissolving at least a portion of the uranium of the fuel into the solution.

Methods for acquiring molybdenum from a uranium comprising material are provided. The methods can include exposing the material to an aqueous solution to form a mixture comprising a solid phase and a liquid phase; separating the solid phase from the liquid phase; and exposing at least a portion of the liquid phase to an adsorbent to remove at least some of the solute from the liquid phase and form an effluent containing the molybdenum.

DRAWINGS

Embodiments of the disclosure are described below with reference to the following accompanying drawings.

FIGS. 4A and 4B are a process scheme according to an embodiment.

FIGS. 6A-6F are another process scheme according to an embodiment.

DESCRIPTION

This disclosure is submitted in furtherance of the constitutional purposes of the U.S. Patent Laws "to promote the progress of science and useful arts" (Article 1, Section 8).

Figure 1:
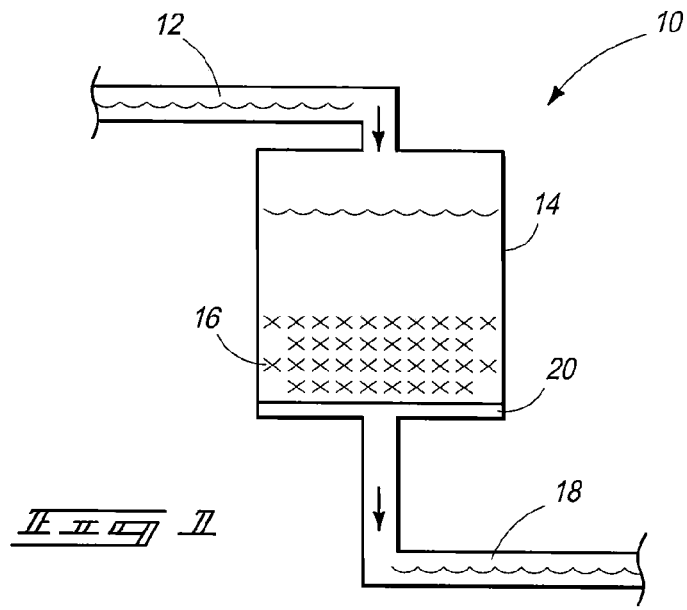
FIG. 1 is a system for treating irradiated nuclear fuel according to an embodiment.

The compositions, methods and systems of the present disclosure will be described with reference to FIGS. 1-6F. Referring first to FIG. 1, a general depiction of a system is shown that may be utilized to provide the compositions and/or perform the methods as described herein. As depicted, system 10 can be considered a continuous dissolution system;

however, other systems may be utilized. For example, systems configured to perform processes such as decanting and/or batch filtration may be utilized. System 10 can include a vessel 14 and material 16. Vessel 14 can be coupled to conduit 12 as well as conduit 18. Vessel 14 may be configured to also include a filter material 20. Filter material 20 can be configured to support material 16 and act to confine solid material within vessel 14 while allowing liquid materials to pass through to conduit 18.

According to example implementations, the volume confined by vessel 14 can be in fluid communication with both conduits 12 and 18. Conduits 12 and 18 can be coupled with pumps and/or valves to facilitate the metered transfer of a solution through vessel 14. System 10 may be utilized to expose the solution to material 16. According to example implementations, this metered transfer can facilitate the dissolution of material 16 using the solution provided from conduit 12.

Material 16 can be irradiated nuclear fuel such as the irradiated nuclear fuel noted above. This fuel can include uranium, transuranics such as plutonium, and/or fission products. It is understood that the chemistry of irradiated nuclear fuel is complex as well as unpredictable, making the treatment of irradiated nuclear fuel difficult and not simply a matter of routine experimentation. The composition of the irradiated nuclear fuel can vary widely depending on the original fuel composition and the type of irradiation performed. The nuclear fuel may have been manufactured for industrial or defense purposes and may have been irradiated according to either protocol. These variables can change the chemistry of the fuel dramatically. To further complicate matters, the irradiated fuel may have been treated after irradiation. For example, material 16 can be oxidized prior to processing as described herein and as oxidized, material 16 may include $U_3O_8$ and/or $UO_3$, for example.

Material 16 can be in the form of pellets, for example, maintaining the shape in which it was manufactured for irradiation. According to example implementations, material 16 can be comprised of particles having average sizes of less than 200 μm. According to other example implementations, the particles can have an average size from about 5 to about 200 μm. The size can also range from about 25 μm to about 200 μm, and in other implementations, the size can range from about 5 μm to about 25 μm.

System 10 can be configured to expose a solution to material 16 within vessel 14. The solution can include one or more of carbonate, peroxide, and ammonium, such as an ammonium cation. The solution can be a carbonate-peroxide solution, an ammonium solution, and/or an ammonium carbonate solution. According to an example implementation, the solution can include ammonium carbonate and peroxide. While ammonium carbonate can be utilized, other carbonates such as sodium carbonate and potassium carbonate may be utilized as well. Ammonium carbonate may be preferred because it can be removed from the product solution via evaporation.

The peroxide can be in the form of hydrogen peroxide. The peroxide within the solution may be at least 0.05 M, for example. The solution may contain at least 0.1 M carbonate species, which may be in the form of ammonium carbonate, for example. The ammonium carbonate within the solution may be at least 0.1 M of the solution prior to being exposed to the material 16. The solution may also be saturated with carbonate species or as high as 2.2 M in some instances. According to example implementations, the ammonium carbonate within the solution can be greater than the concentration of peroxide within the solution. The solution can be saturated with ammonium carbonate and also include 30% (v/v) of a 30% (wt/wt) hydrogen peroxide solution. The solution may have pH>7 and may be as high as 10 or higher. The solution can be exposed to material 16 at room temperature and atmospheric pressure, for example.

Upon being exposed to material 16, the solution and material 16 can form a composition such as a mixture. The mixture can be heterogeneous and include both a solid and liquid phase. According to example implementations, the mixture within vessel 14 can include the irradiated fuel as well as ammonium. The mixture within vessel 14 can include the irradiated nuclear fuel as well as carbonate and peroxide. The mixture can also have at least some of the ammonium comprised of the liquid phase, and at least some of the solid phase comprising the fission products. As disclosed, at least some of the uranium of material 16 within vessel 14 can then be comprised of the liquid phase upon dissolution of material 16 with the solution.

According to example implementations, upon exposure of material 16 to the solution, the uranium within material 16 may oxidize and form a series of carbonate-peroxide complexes. These complexes may ultimately convert to the soluble $UO_2(CO_3)_3^{4-}$, becoming part of the liquid phase The mixture can also include fission products and transuranics which can precipitate as carbonates and hydroxides, thus remaining in the solid phase. The noble metal phase of the irradiated fuel may form a black suspension in the product, thereby remaining in the solid phase as well. According to example embodiments, the partitioning of components of material 16 is detailed in the remaining Figures.

Figure 2:
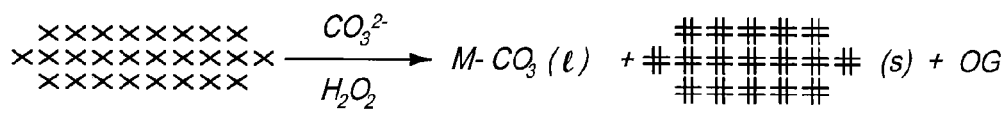
FIG. 2 is a process scheme according to an embodiment.

Referring to FIG. 2, a general scheme for the processing of material 16 is shown wherein material 16 is exposed to the solution containing carbonate and peroxide to form a liquid phase, a solid phase, and a gas phase, for example. Upon exposure of material 16 to the solution, the $UO_2$ can oxidize and dissolve, forming a series of soluble peroxide carbonate complexes which enter the liquid phase. The peroxide within the solution can decompose within a few hours, leaving the dissolved uranium in the uranium oxide carbonate form described. The ammonium salt of this anion may be only moderately soluble and strong ammonium carbonate solutions may precipitate large yellow crystals of $(NH_4)_4UO_2(CO_3)_3$ (ammonium uranyl carbonate). This compound may be redissolved by reducing the ammonium carbonate concentration to about 0.05 M, thus returning the complex to the liquid phase.

Additional hydrogen peroxide may also be utilized to dissolve the ammonium uranyl carbonate into the liquid phase. Several fission products and transuranic elements can form moderately soluble carbonate complexes and be a part of the $M-CO_3(/)$ shown in FIG. 2 at high carbonate concentration. The lanthanides, zirconium, and Pu(IV) may be a part of these carbonates. Where the carbonate concentration is reduced, perhaps later in the process through the evaporation of the ammonium carbonate complex, these moderately soluble carbonate complexes may precipitate and return to the solid phase.

The $M-CO_3(/)$ of the liquid phase can include $UO_2(CO_3)_3^{4-}$ and dilute $(NH_4)_2CO_3$ with various fission products. The liquid phase can have substantially all of the $Cs^+$ and $Rb^+$ and part of the Mo and Tc (as $MoO_4^{2-}$ and $TcO_4^-$). The liquid phase can also contain Se and Te (as, for example, $SeO_3^{2-}$ and $TeO_3^{2-}$) as well as most of the Br and I (as $Br^-$ and $I^-$). The liquid phase can also contain Pd as cationic ammine complexes. Lanthanides, actinides, and Zr can be present at a low concentration as carbonate complexes.

As shown in FIG. 2, there is an off gas (OG) or gas phase that may be generated during the process. This OG phase can include $O_2$ via the decomposition of peroxide. Other gases that may evolve can include $NH_3$, $CO_2$, and $H_2O$. Small amounts of Xe and Kr may also appear in the OG phase. According to example implementations, the noble gas fission products may be captured from this process. The Xe and Kr can be absorbed onto a silica gel at −20° C. after freezing the water and ammonium carbonate on a cold finger cooled with dry ice, for example while allowing oxygen to pass into the atmosphere. The OG can be generated from highest to lowest volume in the following order: $O_2$, $H_2O$, $NH_3$, $CO_2$, Xe, and Kr.

FIG. 2 further depicts solids (####, (s)) which can remain in the solid phase upon dissolution of a portion of material 16 and/or form upon dissolution, as a precipitate, for example. These solids can include $BaCO_3$, $SrCO_3$, $Ln_2(CO_3)_3$, Zr (a non-stoichiometric hydrous oxide), a metallic phase of Mo, Tc, Ru, Rh, and Pd, hydrous $RuO_2$, AgI, $In(OH)_3$, $SbO(OH)_3$, hydrous $SnO_2$, and the transuranic elements. The solids can include Se and As as a non-stoichiometric zirconium selenite and arsenate. Further, the solids can include Pu, Np peroxy carbonates, and/or Am and Cm carbonates.

An example dissolution stoichiometry for $UO_2$ can be as follows:

$$UO_2 + H_2O_2 + 3(NH_4)_2CO_3 \rightarrow (NH_4)_4UO_2(CO_3)_3 + 2NH_4OH \quad (1)$$

Consumption of $H_2O_2$ can be greater than indicated by equation (1). Formation and decomposition of various uranyl peroxide-carbonate complexes can influence $H_2O_2$ consumption. Fission products and higher actinides may consume a somewhat smaller amount of peroxide, carbonate, and hydroxide. The dissolution can generate hydroxide, but the solution may be buffered and the pH should not change materially.

In accordance with an example dissolution of 15 grams of $UO_2$:
15 g of $UO_2$=13.2 g of U=0.0556 mole U
Carbonate consumed=0.167 mole
Peroxide consumed can be approximately 0.2 mole or greater.

According to example implementations, the method may utilize 150 mL 1.5M $(NH_4)_2CO_3$ and 30 mL 30% (10.5M) $H_2O_2$ solution. The final concentrations can be 0.6 M $(NH_4)_2CO_3$ and 0.6 M $H_2O_2$. Hydrogen peroxide can be continually decomposing throughout the dissolution and may be below detection limits in a matter of hours. As hydrogen peroxide is consumed, more can be added to continue the oxidation of the $UO_2$ within the irradiated nuclear fuel.

The volume of $O_2$ generated can be calculated from the difference between the total volume of $H_2O_2$ added and the amount consumed by actual oxidation of $UO_2$ to $UO_2^{2+}$. (The amount consumed by oxidation of other actinides and the fission products can be small compared to oxidation of uranium, and may be ignored).

$$2H_2O_2 \rightarrow 2H_2O + O_2 \quad (2)$$

In accordance with Eq. (2), the total moles $H_2O_2$ added=0.315 moles, moles $H_2O_2$ consumed by $UO_2$=0.0556 moles, and moles $H_2O_2$ left to decompose to $O_2$=0.26 moles. The moles $O_2$ generated=0.13 moles and volume of $O_2$ gas generated=2.9 liters at room temperature.

If more $H_2O_2$ is added during the dissolution to make up for decomposition, then the volume of oxygen gas can be greater by that amount. Spent fuel may decompose $H_2O_2$ faster than unirradiated $UO_2$.

Upon exposure of material 16 to the solution containing carbonate and peroxide, for example, a mixture that includes at least two of a liquid phase, a solid phase, and a gas phase, are demonstrated to be formed. The phases of the mixture may be separated by classic liquid/solid/gas separation techniques such as filtration and/or evaporation. This separation can include continuous liquid dissolution and separation as well as decanting or batch filtration, for example. Referring again to FIG. 1, filter material 20 may be configured to provide such filtration. Upon filtration, the liquid phase can include a substantial amount of uranium and/or plutonium of the irradiated fuel.

In contrast with the PUREX process for example, embodiments of the present disclosure provide methods, compositions, and/or systems that can be utilized to process irradiated fuel with substantially less adverse environmental impact, hazardous risk, and cost. As demonstrated, embodiments of the present disclosure utilize relatively benign aqueous solutions to process the irradiated fuel and these aqueous solutions can be utilized at ambient temperatures and pressures requiring substantially lower energy costs. The PUREX process, on the other hand, utilizes heated nitric acid solutions which require both substantial environmental and toxic exposure preventive measures as well as substantial energy. Further, and in accordance with example implementations, the solutions utilized to dissolve the irradiated fuel can be considered "green reagents" in that they are generally recyclable or they decompose in water or air without adding waste volume.

Figure 3:
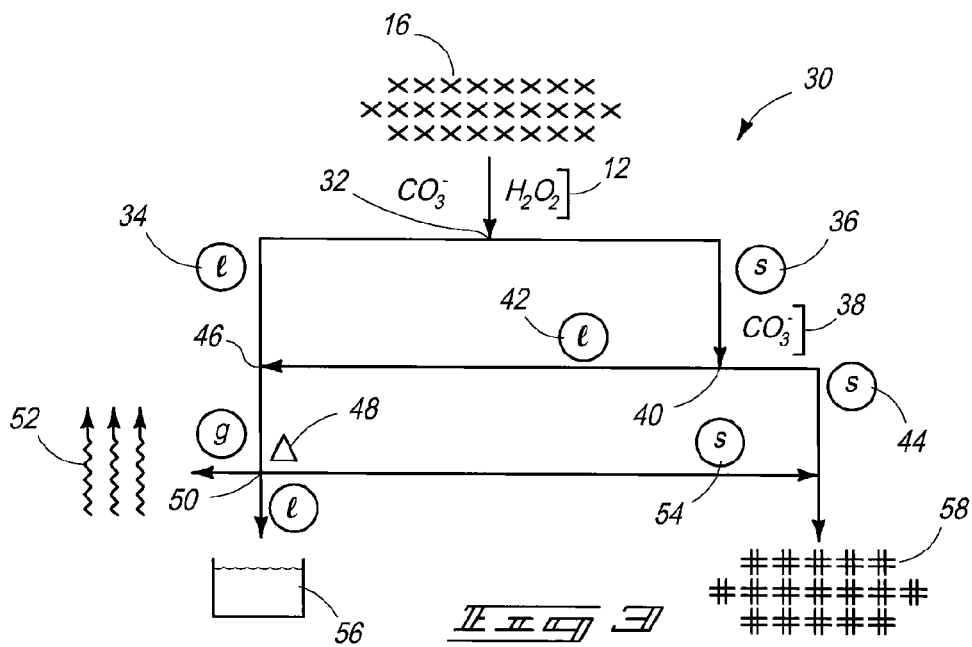
FIG. 3 is a process scheme according to an embodiment.
Figure 5:
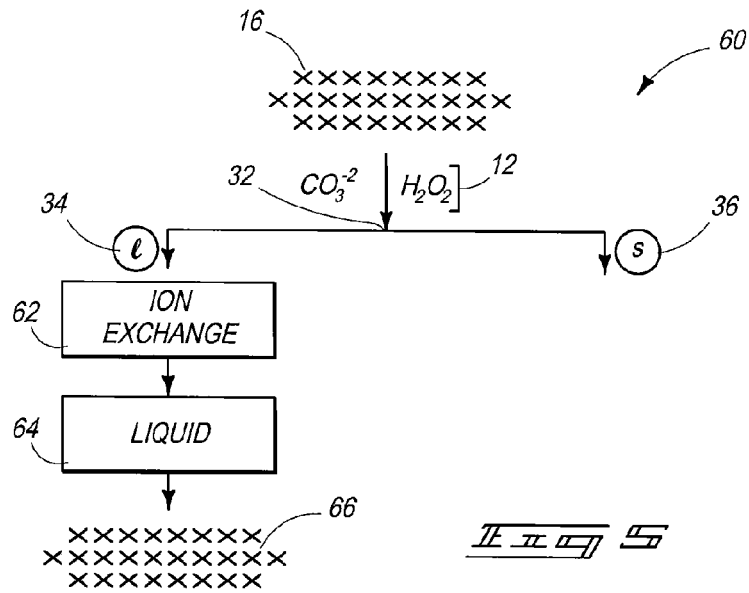
FIG. 5 is a process scheme according to an embodiment.

Referring to FIG. 3, an overall flow scheme for treating material 16 is shown that includes exposing material 16 to solution 12 to form a mixture and then separating the solid and liquid phases at step 32. Upon separation there remains a liquid fraction 34 as well as a solid fraction 36. The solid fraction can be dissolved yet again in a carbonate solution 38. The carbonate solution can be the ammonium carbonate peroxide solution described herein, as well as other carbonate peroxide solutions, for example.

Upon suspension of the solid 36 into solution 38, a solid phase 44 can be separated at 40. The liquid phase 42 can be combined with liquid phase 34 at 46. According to example implementations this combined liquid phase can be heated at 48 to evaporate off ammonium carbonate in the solution in the form of gas 52 as well as separation at 50 to provide product solution 56 and solid 54. Solid 54 can be combined with the solids 44 to provide solid product material 58. According to example implementations, these processes can be performed while maintaining the temperature of the mixtures below about 100° C.

Utilizing the methods, compositions, and/or systems of the present disclosure to treat the irradiated material, actinides such as neptunium and plutonium may be dissolved with the uranium of the material. Hydrogen peroxide can be maintained in the mixture to retain some actinides in the liquid phase. Actinides in heptavalent forms can be produced in the mixture. These actinides can be a stable portion of the liquid phase, and may be separated from one another by adjusting the pH of the liquid phase. For example, heptavalent neptunium may be stable in aerated solutions at low pH, while at this low pH heptavalent plutonium may precipitate. Alternatively, at high pH, the heptavalent plutonium may be stable in the liquid phase and the heptavalent neptunium may precipitate. The solubility stability of other actinides such as Am and Cm may be exploited to foster separation as well.

With reference to FIGS. 4A and 4B, a more detailed scheme is shown that includes the processing of irradiated nuclear fuel including $UO_2$ and fission products that also includes the actinides Np, Pu, Am, and Cm, and Sr. This fuel can be exposed to a solution including ammonium carbonate and peroxide. Upon exposure, a heterogeneous mixture including the liquid phase (soluble fraction) and a solid phase (insoluble fraction) are formed. The phases can be separated by filtration to provide separate solid and liquid phases. The soluble species can include those listed as well as mechanically entrained species that may also be present in the liquid phase.

Referring to FIGS. 4A & 4B, the insoluble fraction may include mechanically entrained soluble species. The insoluble fraction can contain Sr, Ba, Zr, Se, As, Mo, Tc, Ru, Rh, Pd (metallic phase), Ag, In, Ge, Sn, Sb, Np, Pu, Am, and Cm. This solid phase may be exposed (resuspended) in an ammonium carbonate solution such as a 1.5M $(NH_4)_2CO_3$ solution for about 30 min to form another heterogeneous mixture that includes both solid and liquid phases. These phases can be separated and the liquid phases combined. The remaining solid phase may be exposed (washed) to another 1.5M $(NH_4)_2CO_3$ solution before being combined with solids recovered from further liquid phase processing.

Referring to FIG. 4B, the liquid phase recovered from the initial separation can be about a 0.6M $(NH_4)_2CO_3$ aqueous solution having U, Rb, Cs, Mo, Tc, Pd, Cd, Ag, As, Se, Te, Br, and/or I. This solution may contain low concentrations of carbonate complexes of Zr, Ln, Np, Pu, Am, and/or Cm. The solution can be warmed to 40-90° C. for 20-40 min. to decompose most of the $(NH_4)_2CO_3$ and peroxide. This warming can result in the precipitation of a solid phase which can be separated and combined with the previously separated solids. The remaining liquid phase can be about 0.05M $(NH_4)_2CO_3$ and contain U, Rb, Cs, Mo, Pd, Cd, Ag, As, Se, Te, Br, and/or I.

In accordance with example implementations, the actinides are relegated to the solid phase product while the liquid phase product contains substantially all of the uranium. Thus, the actinides can be separated from the uranium of the irradiated fuel utilizing relatively benign reagents and process parameters. Implementations of the embodiments of the disclosure can provide for the separation of these components while generating little environmental waste and utilizing relatively low amounts of energy.

To compare implementations of the methods, systems, and/or compositions of the present disclosure to that of the prior processing techniques, the following non-limiting examples are provided.

Example 1

Carbonate-Peroxide Dissolution Compared to Nitric Acid Dissolution

Carbonate-Peroxide Dissolution. 50-mg subsamples of fuel can be placed into a 125-mL glass Erlenmeyer flask, 20 mL of saturated ammonium carbonate solution can be added and 10 mL of 30% hydrogen peroxide can be added. (Reagent grade chemicals can be utilized.) A magnetic stir bar can be utilized to mechanically agitate the composition and a watch glass placed over the flask. The mixture can be stirred for one hour, then allowed to stand overnight at ambient temperature. Portions of the fuel can dissolve and demonstrate a bright yellow-orange solution, which can fade over the next few days into something that may appear faintly blue through the yellow hot cell window in which the dissolution can be performed. The solution can be gently taken dry on low heat to evaporate off the ammonium carbonate and any remaining hydrogen peroxide. The dry residue can be dissolved in 5 mL of 12M nitric acid and diluted to 50 mL with 2M nitric acid. The product solution can appear a little dark, with a blue cast, through the yellow hot cell window. The final solution from the carbonate fuel dissolution can be acidic. Elements that form insoluble carbonates, such as strontium and the rare earths, can be ultimately dissolved in the final product solution.

Nitric acid fuel dissolution: 50-mg subsamples of fuel can be placed in 125-mL Erlenmeyer flasks and then 15 mL of 12M nitric acid added. A magnetic stir bar can be utilized to mechanically agitate the composition and a glass funnel can be placed in the top of the Erlenmeyer to contain spray and allow the nitric acid to reflux. The composition can then be warmed to nearly boiling for an hour, or until the fuel has substantially dissolved. The composition may not be taken to dry, so that technetium may not be lost to evaporation (as $Tc_2O_7$).

After the bulk of the fuel has substantially dissolved, the composition can be centrifuged to separate the undissolved residue. The supernatant liquid can be poured into a volumetric flask, and the residue in the bottom of the centrifuge tube (presumably the Mo, Tc, Ru, Rh, Pd phase) can be returned to the Erlenmeyer flask and heated again for three hours with 10 mL of concentrated nitric acid, with the funnel in place to contain spatter and reflux the nitric acid.

After three hours of heating, a suspension of black particles can be added to the volumetric flask with the previous solution, and then diluted up to 100.0 mL with 2M nitric acid. Any undissolved particles can ultimately be transferred to the volumetric flask with the sample solution.

Results. The nitric acid fuel dissolution and the carbonate-peroxide fuel dissolution can reveal similar results for every analyte except for technetium (see Table 1). The uncertainty given is total propagated uncertainty at 1 standard deviation. The analytical results are statistically the same for both fuel dissolutions, within two standard deviations, for all analytes except technetium.

Results are given in microcuries of analyte per gram of fuel. The two fuel samples are 25 μm and 5 μm sieved samples. "Carb" refers to room temperature ammonium carbonate, hydrogen peroxide fuel dissolution, and "Nitric" means hot 12M nitric acid dissolution.

The fuel can break up and dissolve completely in the carbonate solution, dissolving the $UO_2$ fuel matrix and a number of other elements, while leaving some other elements in an acid-soluble form. The cesium, europium, americium, strontium, and plutonium can be completely in solution at the end of the carbonate fuel dissolution (in 2M nitric acid).

TABLE 1

| Analytical Data, μCi per gram of fuel ± 1 s uncertainty | | | | | |
|---|---|---|---|---|---|
| Fuel Sample | Cs-134 | Cs-137 | Eu-154 | Eu-155 | Am-241 |
| 25 μm Carb | 9.87E+1 ± 4% | 8.61E+4 ± 3% | 1.26E+3 ± 2% | 2.04E+2 ± 9% | 3.08E+3 ± 4% |
| 25 μm Nitric | 9.36E+1 ± 4% | 8.20E+4 ± 3% | 1.23E+3 ± 2% | 2.08E+2 ± 8% | 2.97E+3 ± 4% |
| 5 μm Carb | 9.72E+1 ± 4% | 8.44E+4 ± 3% | 1.17E+3 ± 2% | 2.12E+2 ± 9% | 2.85E+3 ± 4% |
| 5 μm Nitric | 9.74E+1 ± 4% | 8.44E+4 ± 3% | 1.15E+3 ± 2% | 2.18E+2 ± 15% | 2.74E+3 ± 4% |

TABLE 1-continued

| | Analytical Data, µCi per gram of fuel ± 1 s uncertainty | | | |
|---|---|---|---|---|
| Fuel Sample | Pu-239 + 240 | Pu-238 | Sr-90 | Tc-99 |
| 25 µm Carb | 8.61E+2 ± 4% | 4.14E+3 ± 3% | 4.69E+4 ± 3% | 4.88E+0 ± 3% |
| 25 µm Nitric | 8.38E+2 ± 2% | 4.31E+3 ± 2% | 4.59E+4 ± 3% | 1.17E+1 ± 3% |
| 5 µm Carb | 8.13E+2 ± 4% | 4.05E+3 ± 3% | 4.53E+4 ± 3% | 4.62E+0 ± 3% |
| 5 µm Nitric | 8.41E+2 ± 3% | 4.26E+3 ± 2% | 4.59E+4 ± 3% | 1.45E+1 ± 3% |

The solid and liquid phases produced utilizing embodiments of the methods, systems, and compositions described may be further processed to separate components within each from the respective liquid and/or solid phases. For example and with reference to FIG. 5, a method for acquiring molybdenum from a uranium comprising material is shown. According to example implementations, material 16 can be exposed to an aqueous solution to form a mixture comprising a solid phase and a liquid phase. With reference to the previous description, material 16 can be freshly irradiated fuel and the solid phase can contain Sr, Ba, Zr, Se, As, Ru, Rh, Pd, Ag, In, Ge, Sn, Sb, Np, and Pu. The liquid phase can contain U, Rb, Cs, Mo, Pd, Cd, Ag, As, Se, Te, Br, Sr, Pu, and/or I. As described the solid and liquid phases can be separated to form two distinct phases, liquid phase 34 and solid phase 36.

The liquid phase can be exposed to an adsorbent to remove at least some of the solute from the liquid phase and form an effluent containing the molybdenum. Upon separation, liquid phase 34 can be exposed to an adsorbent such as ion exchange adsorbent 62 and then the effluent from this ion exchange adsorbent processing step can be further purified via liquid/liquid extraction at step 64 to provide material 66 which includes molybdenum. The solids 36 can include fission products.

The methods, systems, and compositions of the present disclosure can thus provide both an environmentally and economically improved process for acquiring particularly valuable metals such as Mo from irradiated fuel. By acquiring these valuable compounds, the processing itself can be made economically feasible and by separating even more mass from portions of the irradiated fuel, the amount of fuel left to be regulated decreases, which decreases cost of environmental handling.

According to example implementations, irradiated nuclear fuel containing fission products can be dissolved in an ammonium carbonate solution. The nuclear fuel may be received in regulated containers and these containers can be first perforated to allow for gas removal. As an example, radiolysis gases can be removed from containers in hotcell by drilling a hole(s) into the containers and evacuating the gases to a cryogenically cooled gas absorbent trap such as a liquid nitrogen-cooled charcoal trap, for example. These traps can be removed and stored to allow for decay of short-lived isotopes of Xe, Kr, $I_2$, and/or $Br_2$.

The containers can then be opened to allow for immersion of targets within containers in about 10 L/ea. of 1M ammonium carbonate solution. Each target can contain as much as 500 g of uranium. $H_2O_2$ can then be added to each mixture to bring the concentration of the mixture to 0.2M $H_2O_2$ and the mixture gently stirred. Each of these mixtures being considered a dissolver solution.

Figure 6A:
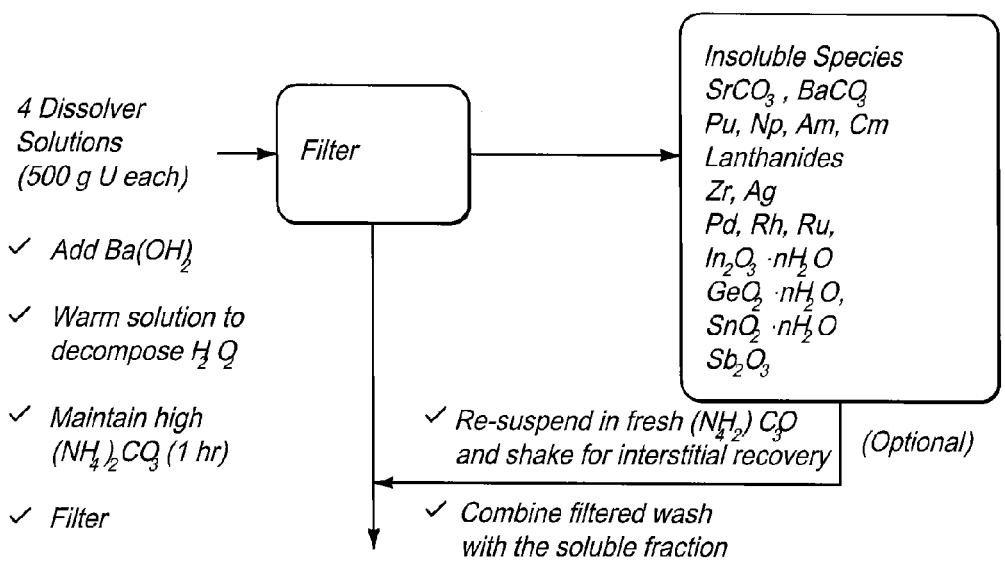
Figure 6D:
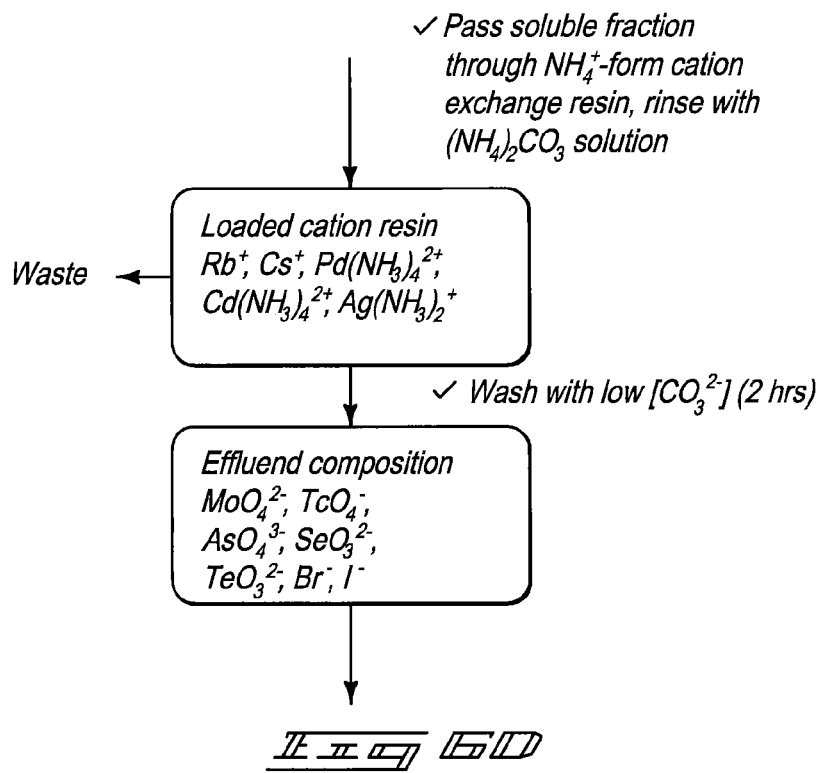
Figure 6E:
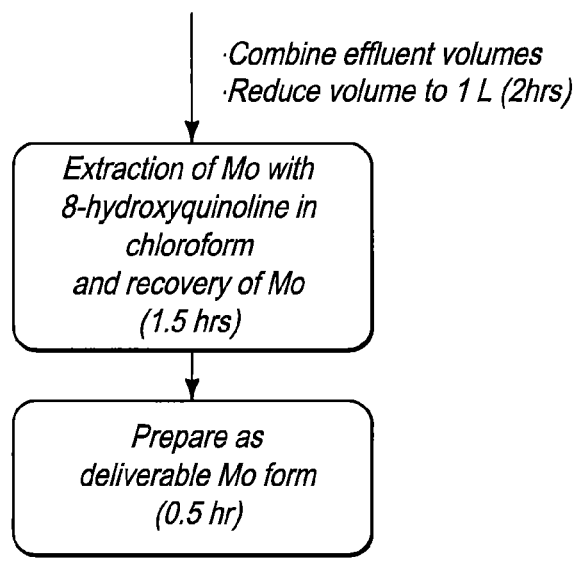

Referring to FIGS. 6A-6F, a more detailed scheme for acquiring molybdenum from the dissolver solutions is depicted. As depicted in FIG. 6A, the dissolver solutions can be combined, a hydroxide such as $Ba(OH)_2$ added, and the solution warmed to decompose any remaining peroxide while maintaining a high carbonate concentration. These liquid phase portions can be acquired via the dissolution of irradiated fuel as described above and/or in accordance with the methods, systems, and compositions of the present disclosure.

This solution can then be filtered to provide both a soluble fraction and an insoluble fraction. The insoluble fraction can include Sr, Ba, Pu, Np, Am, Cm, Zr, Ag, Pd, Rh, Ru, In, Ge, Sn, and/or Sb, for example. This insoluble portion can be exposed to a carbonate solution to provide another liquid phase that may be combined with the soluble fraction. The combined soluble fraction can contain U, Rb, Cs, Mo, Tc, Pd, Cd, Ag, As, Se, Te, Br, and/or I, for example.

The soluble fraction may then be treated in accordance with alternative schemes, neither of which is mutually exclusive. In accordance with one scheme, the soluble fraction can then be passed through a carbonate loaded anion exchange resin capturing substantially all of the U but allowing effluent containing substantially all remaining components of the liquid fraction to pass, the Mo-effluent. This resin can be 8 L, 15 L, and/or from 8 L to 15 L. This effluent can contain Rb, Cs, Pd, Cd, Ag, Mo, Tc, As, Se, Te, Br, and/or I. In accordance with this scheme, the resin will be sufficiently robust to radiolysis from high dose cationic species in the soluble fraction for batches as large as 20 targets, for example.

In accordance with an alternative scheme, the soluble fraction shown in FIG. 6A and obtained from the filtered dissolver solution can then be passed through a cation exchange resin, such as a $NH_4^+$-form cation exchange resin, and rinsed with an ammonium carbonate solution such as a 0.005M $(NH_4)_2CO_3$ solution to provide an effluent that contains $UO_2(CO_3)_3^{4-}$, $MoO_4^{2-}$, $TcO_4^-$, $AsO_4^{3-}$, $SeO_3^{2-}$, $TeO_3^{2-}$ $Br^-$ and/or $I^-$, the alternative Mo-effluent. Either one or both of these Mo-effluents can be further treated by organic extraction as described below.

The Mo-effluent recovered from the anion resin may also be further treated with a cation resin prior to organic extraction. The Mo-effluent can then be passed through an ammonium loaded ion exchange resin to capture Rb, Cs, Pd, Cd, and/or Ag. The effluent passing this ammonium loaded resin can include Mo, Tc, As, Se, Te, Br, and/or I. The captured components can be washed from the resin and combined as waste if desired.

The effluents from resins can subjected to liquid/liquid extraction to acquire the Mo from the mixture of Mo, Tc, As, Se, Te, Br, and/or I. This effluent can primarily be an aqueous carbonate solution and this solution can be exposed to a primarily organic solution such as 8-hydroxyquinoline in chloroform, for example. The Mo can be removed from the solution and the remaining aqueous phase discarded if desired. In accordance with example implementations, the systems, methods, and compositions of the present disclosure can provide for the dissolution of the irradiated fuel with solutions that are manageable when utilizing ion exchange purification techniques. For example, the ammonium carbonate system of the solutions can allow for a substantially efficient purification utilizing ion exchange resin under aqueous conditions, while only a single step of the method utilizes an organic solvent, thereby providing methods that can recover Mo under environmentally as well as economically friendly conditions.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

What is claimed is:

1. A method for acquiring molybdenum from irradiated nuclear fuel, the method comprising:
    exposing the irradiated nuclear fuel to an aqueous solution to form a mixture comprising a solid phase and a liquid phase while maintaining the pH of the liquid phase at from greater than 7 to less than 10;
    separating the solid phase from the liquid phase; and
    exposing at least a portion of the liquid phase to an adsorbent to remove at least some of the solute from the liquid phase and form an effluent containing the molybdenum.

2. The method of claim 1 wherein the aqueous solution comprises one or more of ammonium, carbonate, and peroxide.

3. The method of claim 1 wherein the solid phase comprises fission products.

4. The method of claim 1 wherein the adsorbent comprises an ion exchange resin.

5. The method of claim 1 further comprising exposing the effluent to an extraction solution to purify the molybdenum.

6. The method of claim 1 wherein the aqueous solution comprises carbonate and peroxide.

7. The method of claim 1 wherein the aqueous solution comprises ammonium, carbonate, and peroxide.

8. The method of claim 1 wherein the liquid phase comprises uranium and molybdenum.

9. The method of claim 8 wherein upon exposing at least a portion of the liquid phase to the adsorbent, at least a portion of the uranium is retained by the adsorbent.

10. A method for acquiring molybdenum from irradiated nuclear fuel, the method comprising:
    exposing the irradiated nuclear fuel to an ammonium-carbonate solution to form at least one mixture comprising both a liquid and solid phase while maintaining the pH of the liquid phase at from greater than 7 to less than 10, the exposing dissolving at least a portion of the uranium of the uranium comprising material into the liquid phase;
    separating the liquid phase from the solid phase; and
    processing the liquid phase to acquire the molybdenum.

11. The method of claim 10 wherein the irradiated nuclear fuel are targets within regulated containers.

12. The method of claim 11 further comprising exposing the targets to peroxide.

13. The method of claim 10 wherein the processing the liquid phase can comprise combining the liquid phase with a hydroxide solution to form another mixture.

14. The method of claim 13 wherein the hydroxide solution comprises Ba.

15. The method of claim 13 wherein the processing the liquid phase can further comprise warming the other mixture while maintaining ammonium carbonate in the other mixture.

16. The method of claim 15 wherein the processing the liquid phase can further comprise exposing the other mixture to an adsorbent to acquire the molybdenum.

17. The method of claim 1 wherein the aqueous solution comprises ammonium carbonate.

18. The method of claim 1 wherein the irradiated nuclear fuel contains plutonium and molybdenum, the entirety of the plutonium and molybdenum entering the liquid phase upon the exposing.

* * * * *

UNITED STATES PATENT AND TRADEMARK OFFICE
CERTIFICATE OF CORRECTION

| | | |
|---|---|---|
| PATENT NO. | : 8,506,911 B2 | Page 1 of 1 |
| APPLICATION NO. | : 12/511341 | |
| DATED | : August 13, 2013 | |
| INVENTOR(S) | : Chuck Z. Soderquist et al. | |

It is certified that error appears in the above-identified patent and that said Letters Patent is hereby corrected as shown below:

Title page 2, right column, line 36, Clark reference, delete "Univeristy" after "Yale" and insert --University--.

In the Specification

Column 4, line 22, delete "phase" after "the liquid" and insert --phase.--.

Column 10, line 55, insert --be-- after "resins can".

Signed and Sealed this
Twenty-first Day of October, 2014

Michelle K. Lee
*Deputy Director of the United States Patent and Trademark Office*